Sept. 10, 1946.  G. SMOLAK  2,407,520
MANUFACTURE OF DIELECTRIC SHAPES
Filed Dec. 16, 1943
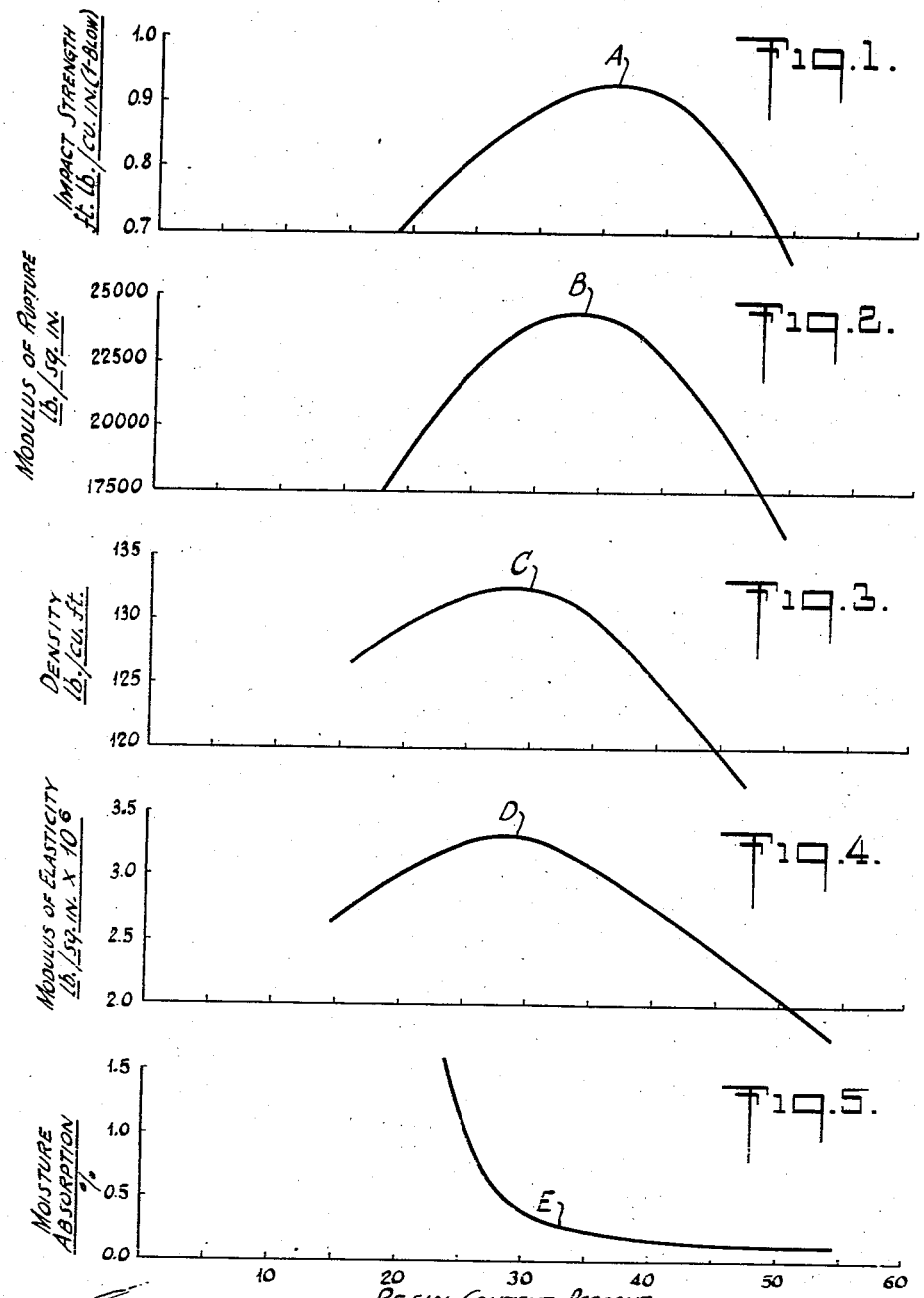
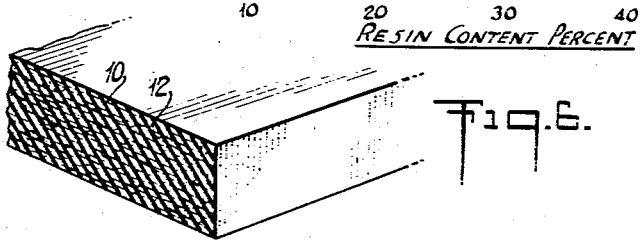
INVENTOR
GEORGE SMOLAK.
ATTORNEY Patented Sept. 10, 1946

2,407,520

UNITED STATES PATENT OFFICE 2,407,520

MANUFACTURE OF DIELECTRIC SHAPES

George Smolak, Somerville, N. J., assignor to Johns-Manville Corporation, New York, N. Y., a corporation of New York Application December 16, 1943, Serial No. 514,446

2 Claims. (Cl. 260—38)

This invention relates to the manufacture of tough and strong structural dielectric sheets or shapes having properties particularly adapted for use as switchboard panels and the like.

Serious difficulties have been encountered by those attempting to solve the problem of providing dielectric panels of suitable large size and dielectric properties and having the impact and flexural strength to withstand the severe mechanical strains which are imposed particularly by naval and marine service. Such service demands panels having high mechanical and dielectric strength and which exhibit dielectric stability over a wide temperature range and in moist atmospheres.

An object of the present invention is to provide a fibro-cementitious sheet or shape having high dielectric, impact and flexural strengths and heat and moisture resistance adapting it for severe naval service.

Another object is to provide a simple and an economical method for manufacturing dielectric sheets and panels having the requisite dielectric and physical properties and size for use as naval switchboard panels.

The present invention provides a tough and hard surfaced molded shape which is highly resistant to moisture penetration, has good dielectric strength and dielectric stability in moist atmospheres, possesses dimensional stability and physical strength throughout a wide temperature range and which resists charring and burning on exposure to arcing or short circuiting.

The invention consists in the improved structural dielectric sheets or shapes and method of manufacture which are hereinafter described and more particularly defined in the accompanying claims.

In the following description of a preferred form of the invention, reference will be made to the accompanying drawing in which:

Fig. 1 presents a curve in which the impact strengths of dielectric panels made up as herein described, are plotted against the proportions of fiber and resin in their composition;

Fig. 2 presents a curve showing how the transverse strength or modulus of rupture is affected by changes in the proportions of fiber and resin;

Fig. 3 presents a curve plotting changes in density with changes in proportions of fiber and resin;

Fig. 4 presents a curve plotting changes in modulus of elasticity with changes in proportions of fiber and resin;

Fig. 5 presents a curve plotting changes in moisture absorption of a panel with changes in proportions of fiber and resin; and Fig. 6 is a perspective view (partly in section) showing a fragment of a dielectric panel manufactured in accordance with the invention.

The first step in preparing structural dielectric sheets in accordance with the present invention is to subject a supply of crocidolite asbestos fibers to a thorough willowing treatment, to open the fibers, to fiberize coarse fiber pencils, and to produce well-opened fine fibers of average length approximating ¼ inch. After the crocidolite fibers have been thoroughly willowed, they are subjected to a further opening and fluffing operation, as by being passed through an air blower, to break up any clots of matted fibers. Thoroughly opened and fluffed fibers are then introduced into a batch mixer and mixed therein with a measured proportion of finely pulverized and screened heat hardenable "B" stage phenolic or Bakelite resins (for example, type BR 7095). It should be understood that the composition of such resins may be varied considerably, and that they may incorporate plasticizing and modifying agents and may be prepared by condensing and polymerizing reactions involving hydroxy-aromatic homologues of phenol and compounds including formaldehyde having a reactive methylene radical. The preferred mixture incorporates approximately 62.5% by weight of crocidolite fibers and 37.5% of phenol-formaldehyde type resin. The fibers and resin are thoroughly mixed in a dry state to effect substantially uniform dispersion of the resin particles over the exposed surfaces of the fluffed fiber. This mixing operation may be carried out in a rotary paddle type mixer or in a hammer mill type of mixer. From the mixer the thoroughly dispersed, dry mixture of fibers and heat hardenable resin may be conveyed to a preforming or cold molding unit or directly to a hot press molding and curing unit.

Wet mixing is avoided because it has been found that when the resin binder is incorporated in the resin-fiber mixture as a liquid, it is difficult to produce a mixture of uniform composition, since the liquid resins are comparatively viscous, and since the volume of resin is small in comparison with the volume of highly fluffed asbestos fibers. Moreover, when a solvent is employed to increase the volume and to decrease the viscosity of the resin binder, an additional process step is required to remove this solvent, and this solvent removal operation, and the problem of replacing or recovering the solvent, adds substantially to the expense of the process.

The process is particularly adapted for manufacturing structural dielectric shapes and panels of monolithic (as distinguished from laminate) structure and of comparatively large size. For example, the process is applied particularly to the manufacture of naval switchboard panels having face areas of 15 to 30 sq. ft. and varying in thickness from ¼–2 inches. The dry molding mixture of opened and fluffed crocidolite fibers and resin particles which is required for producing a panel of the indicated size is comparatively bulky. The preferred method of operation therefore contemplates a step of compressing and preforming the dry mixture of asbestos fibers and resin binder under high pressure in a cold mold, as a preliminary to completing the consolidation of the sheet and cure hardening of the resin under heat and pressure. In a preforming operation for producing a panel of 1 inch thickness, for example, the dry resin-fiber mixture is preferably subjected in a batch mold at normal temperature to pressures of at least 1500 lbs. per sq. inch and preferably to pressures of 3000 or more pounds per square inch. In this preforming operation, the bulky mixture of fibers and resin is compressed and shaped to a rigid handleable preform mat or sheet which may have substantially the ultimate face dimensions of the panel and which may have a thickness of say 2¼ to 3 inches. Since the preforming operation is applied directly to the fluffed fiber-resin mixture, there is developed a certain heterogeneous or random lay of the fibers in the cold preform shape. By reason of this random lay of the fibers and the preforming operation on the full charge of fiber-resin mixture, the final product has a monolithic structure which is more uniform in strength than a laminated product of the same general composition.

Preform shapes of the indicated range of thickness may be reduced to approximately 1 inch thickness during a final curing operation in a hot press mold under a pressure of at least approximately 2000 lbs. per square inch pressure, and under a curing temperature of approximately 300–350° F. The final shaping and curing operation may be carried out, or at least initiated, in a hot press mold having confining side walls which are dimensioned to the final dimensions of the panel which it is desired to produce. Because of the large size and thickness of the panels which are manufactured in accordance with the present invention, a prolonged curing period of at least 30 minutes to 1 hour is required to develop complete cure of the resin throughout a sheet of say 1 inch thickness. After forming and initiating cure of the sheet by molding under pressure and elevated temperature, the cure of the resin can be completed by oven heat treatment.

The curing temperature and pressure must be such as to soften the resin and to insure complete filling of the mold by the resin-fiber mixture. The curing temperature and pressure must also be such as to consolidate and densify the mold charge and to effect polymerization reaction hardening of the resin binder. Some variations in both temperature and pressure may be necessary in employing other types of bonding resin and in molding sheets or shapes of different dimensions.

The cured shape (Fig. 6) has a smooth hard surface and a dense monolithic structure in which the crocidolite asbestos fibers 10 are disposed in heterogeneous or random intermeshed lay and uniformly coated with and bonded by the phenolic resin binder 12.

The curing cycle preferably includes a short breathing period under reduced pressure. For example the full cycle may include initial curing between hot platens at a temperature of approximately 300° F. and under 2,000 pounds per square inch pressure for a period of say 5 minutes. This period of initial cure is followed by a period of reduced pressure heating during which the sheet or panel is held at curing temperature under a reduced pressure not exceeding about 500 pounds per square inch for a period of say 3 minutes. This low pressure curing period is then followed by prolonged final curing treatment at the indicated molding temperature and under full mold pressure of about 2,000 pounds per square inch. The final curing period may last as long as 45 to 50 minutes, depending on the thickness of the panel.

Appended hereto is a table illustrating the effect on the properties of cured sheets or panels of comparable size when employing crocidolite asbestos fibers, in place of chrysotile asbestos fibers, as the reinforcing element. By replacing chrysotile fiber in the same formula with crocidolite fiber, the impact strength of the resulting panel is increased from 0.4 ft. lbs./cu. inch to 0.9 ft. lbs./cu. inch. The dielectric strength of a sheet reinforced with crocidolite fiber is 55 volts per mil, as compared to only 37 volts per mil for a sheet reinforced with chrysotile fibers. The sheets incorporating chrysotile fiber as the reinforcing material exhibit high electrical leakage near the breakdown value when subjected to electrical stress. Whereas the sheets made with crocidolite fiber display relatively small electrical leakage under the same conditions.

| Composition of sheet | Flexural strength | Impact strength | Dielectric strength |
| --- | --- | --- | --- |
| | Lbs./sq. in. | Ft. lbs./ cu. in. | V./mil |
| 70% Chrysotile fiber and 30% phenol-formaldehyde resin. | 12,000 | 0.4 | 37 |
| 70% Crocidolite fiber and 30% phenol-formaldehyde resin. | 22,000 | 0.9 | 55 |

Fibro-cementitious sheets and panels of suitable dielectric and structural strength for severe naval surface can best be manufactured from compositions of the type herein described in which crocidolite asbestos fiber is the principal constituent. For maximum strength, it is essential that the crocidolite asbestos be thoroughly willowed and opened, and that the average length of the fibers shall be not substantially less than about ¼ inch. A suitable grade of crocidolite asbestos fiber has been found to classify as to length: 23.8% of 0.1 inch length or less, 25.1% of 0.1–0.2 inch, 24.6% of 0.2–0.3 inch, 16.7% of 0.3–0.4 inch, and 9.8% of 0.4–1.0 inch. To produce a structural dielectric panel which exhibits optimum impact and flexural strength, dielectric stability, and optimum low moisture absorption it has been found that the proportions of fiber and resin in the composition are critical. Referring to the charts presented in Figs. 1–5 of the drawing, curve A shows that panels or sheets in which the fiber proportions lie within the range 60–70% fiber and 30–40% resin exhibit maximum impact strength. Curve B shows that the maximum modulus of rupture or flexural strength is also exhibited by panels having a composition of about 65% fibers and 35% resin. Curves C and D show that the maximum density and the maximum modulus of elasticity are exhibited by panels having a composition of about 70% fiber and about 30% resin. For satisfactory dielectric stability the moisture absorption of the panel (curve E) should not exceed about 0.4% by weight after immersion for 24–48 hours. Panels having a composition of 30–40% resin and 60–70% fiber exhibit satisfactorily low water absorption. The optimum composition for crocidolite fiber –B stage phenolic resin panels is approximately 62½% fibers and approximately 37½% resin.

The physical properties of cured panels, as plotted in the curves of Figs. 1–5, were obtained by standard test procedures. Information for plotting the curves of Figs. 2 and 4 was obtained by applying a load to the center of a test panel strip having a 9 inch span between supports, at the rate of 2,000 lbs. per minute, until failure occurs. The center deflections were determined at uniform increments of load. The impact resistance, as plotted in the curve of Fig. 1, was determined for test panels by measuring the force of a blow which will just cause failure in one blow, such blow being delivered to the center of a 9 inch span by a weight rounded at its striking end to a 1 inch radius. The impact resistance is reported as unit energy (single blow) per unit volume of sample. Water absorption was determined by immersing test specimens in water for a period of 48 hours at room temperature. Brinell hardness tests were made on the hard surface of a cured panel by measuring indentations effected by application of a 1500 kilogram load through a 10 mm. steel ball over a period of 10 seconds.

After curing, the panel sheets normally exhibit a Brinell hardness number of approximately 100, an impact strength of approximately 0.9–1 ft. lb. per cu. inch, a flexural strength of approximately 24,000 lbs. per sq. inch, a density of approximately 130 lbs. per cu. ft. and a maximum water absorption after 24–48 hours immersion of about 0.2–0.3%. Such sheets or panels have a modulus of elasticity in the neighborhood of 3 million lbs. per sq. inch, and have a dielectric strength of at least 55 v. per mil thickness.

Since many variations may be made from the illustrative details given, without departing from the scope of the invention, it is intended that the invention should be limited only by the terms of the claims interpreted as broadly as consistent with novelty over the prior art.

What I claim is:

1. A hard and tough dielectric panel having an impact strength of not less than 0.9–1.0 ft. lb. per cubic inch, a dielectric strength of at least 55 v. per mil thickness, and a flexural strength exceeding 22,500 lbs. per sq. inch, and comprising 60–70% by weight of long crocidolite asbestos fibers, said fibers being coated and bonded together with 30–40% of heat hardened phenol-aldehyde resin.

2. A hard and dense fibro-cementitious panel of monolithic structure, comprising approximately 65% by weight of crocidolite asbestos fibers averaging ¼ inch in length and arranged in heterogeneous lay, and approximately 35% heat hardened phenol-aldehyde resin binder, said shape having a maximum water absorption of not to exceed 0.4%, an impact strength of at least 0.9 ft. lbs. per cubic inch, and a flexural strength exceeding 22,500 lbs. sq. inch.

GEORGE SMOLAK.